United States Patent [19]

Kassmann

[11] Patent Number: 5,642,205
[45] Date of Patent: Jun. 24, 1997

[54] METHOD AND SYSTEM FOR PRINTING A SIMPLEX FAX COVER WHEN IN A DUPLEX FAX PRINTING MODE

[75] Inventor: Gary W. Kassmann, Rochester, N.Y.

[73] Assignee: Xerox Corporation, Stamford, Conn.

[21] Appl. No.: 525,446

[22] Filed: Sep. 8, 1995

[51] Int. Cl.⁶ .................. H04N 1/00; H04N 1/04; H04N 1/40; G03B 27/32
[52] U.S. Cl. .................. 358/468; 358/400; 358/498; 358/448; 358/434; 358/436; 358/438; 358/496; 355/24; 399/364
[58] Field of Search .................. 358/468, 400, 358/496, 498, 448, 434, 436, 438; 355/24, 319, 320; 395/111

[56] References Cited

U.S. PATENT DOCUMENTS

| | | | |
|---|---|---|---|
| 4,352,012 | 9/1982 | Verderber et al. | 358/498 |
| 5,124,731 | 6/1992 | Knodt et al. | 355/319 |
| 5,243,439 | 9/1993 | Jacobus et al. | 358/448 |
| 5,282,050 | 1/1994 | Ishizuka et al. | 358/400 |
| 5,289,290 | 2/1994 | Suzuki et al. | 358/468 |
| 5,414,528 | 5/1995 | Hatamura | 358/440 |

*Primary Examiner*—Edward L. Coles, Sr.
*Assistant Examiner*—Tia M. Harris
*Attorney, Agent, or Firm*—Michael J. Nickerson

[57] ABSTRACT

A method and system for printing a transmitted document having a cover page. The system determines if a present state of operation is a duplex mode and if a cover page has been transmitted. The system then prints, when the present state of operation is determined to be duplex and a cover page has been transmitted, the cover page as a simplex document and the remaining portion as a duplex document. On the other hand, the system prints the cover page and remaining portion of the transmitted document as a simplex document when it is determined that the present state of operation is a simplex mode.

2 Claims, 5 Drawing Sheets

METHOD AND SYSTEM FOR PRINTING A SIMPLEX FAX COVER WHEN IN A DUPLEX FAX PRINTING MODE

FIELD OF THE PRESENT INVENTION

The present invention is directed to a method of duplex fax printing. More specifically, the present invention is directed to a method and system for simplex printing of a fax cover sheet when a facsimile machine has been placed in a duplex fax printing mode.

BACKGROUND OF THE PRESENT INVENTION

FIG. 1 illustrates a conventional method of printing a facsimile transmission. As illustrated in FIG. 1, a document is prepared to be transmitted by a transmitter 100 to a receiving station or receiver 101 through a communication channel 110. In the example illustrated in FIG. 1, the document includes a cover sheet 1 and pages 1–4 (sheets 2, 3, 4, and 5) which are to be transmitted by the transmitter 100 to the receiver 101.

To facilitate the transmission of the document to the receiver 101, the transmitter 100 includes a scanner which scans the sheets 1, 2, 3, 4, and 5 (cover sheet and pages 1–4) and converts the light reflected from the sheets during the scanning process into electrical signals which are digitized into image data representing, electronically, the images which have been scanned. This digital image data is then transmitted by the transmitter 100 along communication channel 110 to a receiver 101.

The communication channel may be a typical telecommunication channel, wherein the telecommunication medium is electrically conductive wires or an optic fiber transmitting the image data as light pulses, or the communication channel medium may be the air wherein the image data is transmitted either as microwaves or radio waves.

Upon receiving this digital image data, the receiver 101 converts the digital image data into electronic print data which is utilized by a digital printing device to print the image as scanned by the transmitter 100. In the conventional operations, the transmitter 100 scans in a simplex document and the receiver 101 prints a simplex document.

To give the user of the receiver 101 the option of cost savings with respect to consumable paper supplies, conventional facsimile machines have been recently provided with the option of duplex printing. Such an example is illustrated in FIG. 2.

The process illustrated in FIG. 2 is the same as that of FIG. 1 except for the printing process at the receiver 102. As illustrated in FIG. 2, if the user of the receiver 102 has selected the duplex printing option, the five sheet transmitted document received by the receiver is printed as a three sheet duplex document. More specifically, on sheet 21, the cover sheet (sheet 1) of the transmitted document is printed on one side of sheet 21 and page 1 (sheet 2) of the transmitted document is printed on the other side of sheet 21. Moreover, sheet 22 has page 2 (sheet 3) printed on one side of sheet 22 and page 3 (sheet 4) of the transmitted document printed on the other side of sheet 22. Lastly, sheet 23 has page 4 (sheet 5) printed on one side of the sheet and no image printed on the other side of sheet 23. Thus, by selecting the duplex fax printing option, the user of the receiver 102 can eliminate two sheets of paper, thereby realizing a savings in the use of consumable paper.

However, the selection of this conventional duplex fax printing option can cause problems. For example, as illustrated in FIG. 2, fax jobs typically contain a cover sheet as a first page. This cover sheet is intended to be used for routing purposes and to provide the receiver a total page count verification. More specifically, the cover sheet is not intended to be part of the set of transmitted original documents and is typically discarded by the recipient. Thus, when selecting the duplex printing option in a conventional facsimile machine, the incoming jobs are printed as duplex jobs. In other words, the first sheet to be printed contains the cover sheet on its front side and the first page of the principle document on its back side. Therefore, the recipient must keep the cover sheet as it contains part of the principle document on the back side. Such results can be undesirable for some applications, especially when the recipient wishes to use the faxed documents as originals.

Therefore, it is desirable to provide a duplex option which avoids the printing of the cover sheet on the same sheet as the first page of the principle document.

SUMMARY OF THE PRESENT INVENTION

One aspect of the present invention is a facsimile system for printing a transmitted document having a cover page. The system includes a simplex/duplex mode selector, a receiver, and a printer. The printer prints, when the simplex/duplex mode selector indicates a duplex mode, the cover page of the transmitted document received by the receiver as a simplex document and a remaining portion of the transmitted document received by the receiver as a duplex document.

Another aspect of the present invention is a method for printing a transmitted document having a cover page. The method determines if a present state of operation is a duplex mode; prints the cover page of the transmitted document as a simplex document when the present state of operation is determined to be the duplex mode; and prints a remaining portion of the transmitted document as a duplex document when the present state of operation is determined to be the duplex mode.

A third aspect of the present invention is a method for printing a document transmitted from a transmitter at a receiver. The method determines if a present state of operation is a duplex mode; determines if a cover page is being transmitted as part of the document; prints a first page of the document as a simplex document when the present state of operation is determined to be the duplex mode and a cover page is being transmitted; and prints a remaining portion of the document as a duplex document when the present state of operation is determined to be the duplex mode and a cover page is being transmitted.

Further objects and advantages of the present invention will become apparent from the following description of the various features of the present invention.

BRIEF DESCRIPTION OF THE DRAWINGS

The following is a brief description of each drawing used in describing the present invention, and thus, are being presented for illustrative purposes only and should not be limitative of the scope of the present invention, wherein.

DETAILED DESCRIPTION OF THE PRESENT INVENTION

Figure 1:
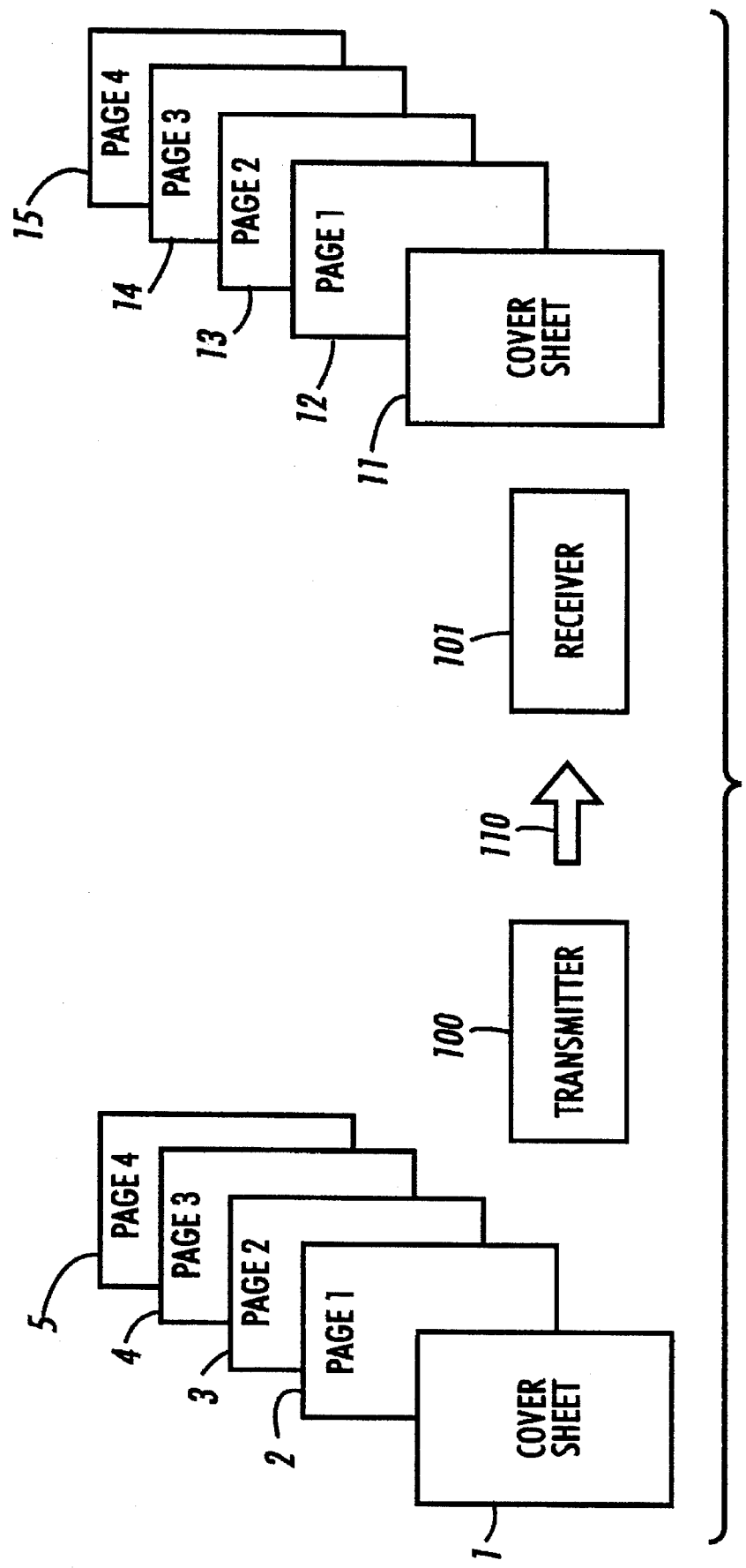
FIG. 1 illustrates a simplex fax printing operations of a conventional facsimile machine.
Figure 2:
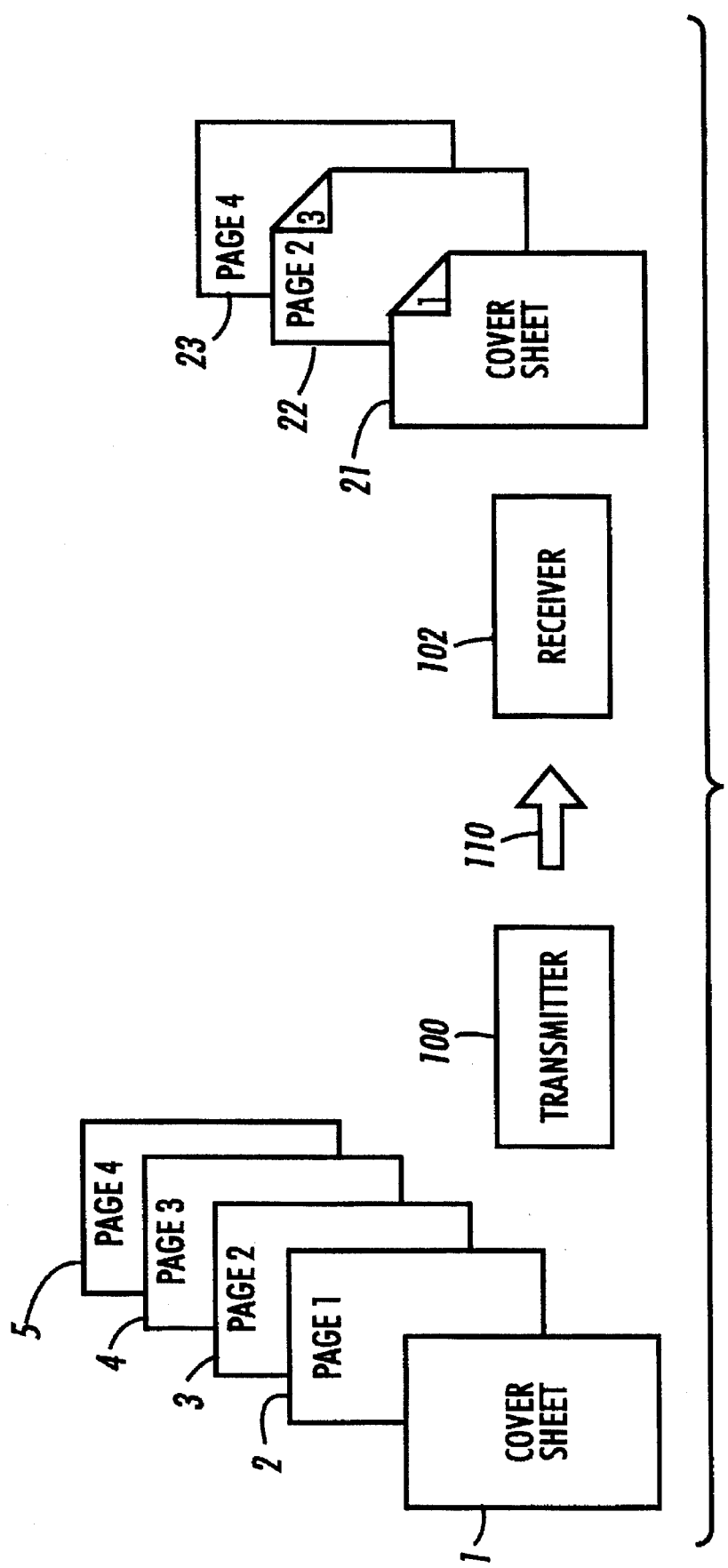
FIG. 2 illustrates the duplex fax printing operation of a conventional facsimile machine.

For a general understanding of the present invention, reference is made to the drawings. In the drawings and in the specification, like reference numerals have been used throughout to designate identical or equivalent elements or steps.

Figure 3:
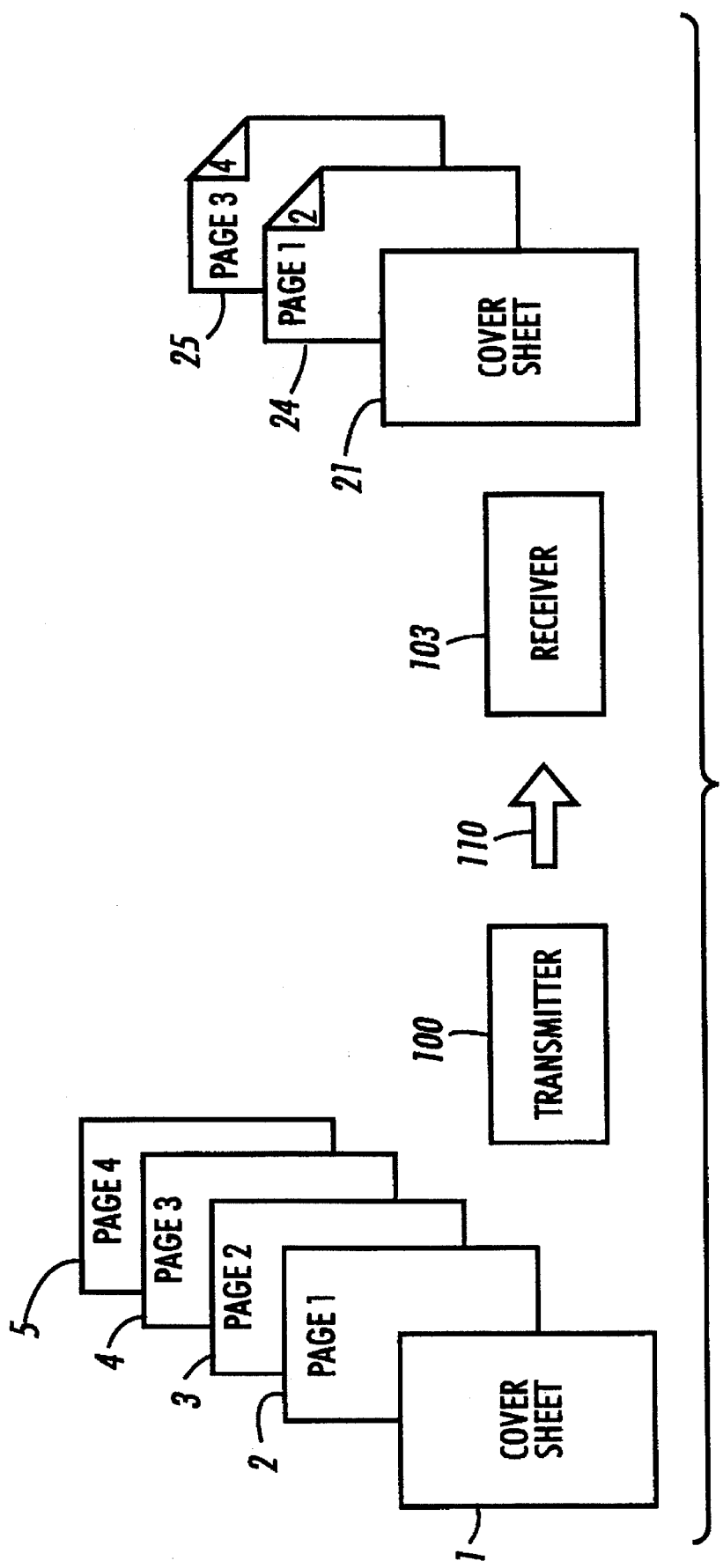
FIG. 3 illustrates the duplex fax printing operations of the present invention.

FIG. 3 illustrates the duplex fax printing operations of a fax machine utilizing the concepts of the present invention. As illustrated in FIG. 3, a transmitter 100 prepares to transmit a document to receiver 103 through a communication channel 110. Prior to transmitting a sheet of the document to the receiver 103, the transmitter 100 scans in the sheet of the document. More specifically, the transmitter 100 scans in the cover sheet 1, the second sheet 2 (page 1), the third sheet 3 (page 2), the fourth sheet 4 (page 3), and the fifth sheet (page 4). Upon scanning each of these sheets, electrical signals are produced from the light reflected from the sheets which correspond to image data electronically representing the images on the sheets that have been scanned. This digital image data is then transmitted by the transmitter 100 to the receiver 103 through the communication channel 110.

The receiver 103 includes a switch which enables the recipient to choose either a simplex printing mode or a duplex printing mode. FIG. 3 illustrates the selection of the duplex printing mode. If the user selects the simplex printing mode, the receiver 103 produces the same type of output as illustrated in FIG. 1.

When the user selects the duplex printing mode, the receiver 103 utilizes the digital image data to render the transmitted document onto sheets. However, the receiver 103 does not print all the images of the transmitted document in a duplex fashion. More specifically, the receiver 103 prints the transmitted cover sheet on sheet 21 as a simplex document. Thereafter, the receiver 103 prints the remaining portion of the transmitted document in a duplex fashion. For example, the receiver 103 prints on sheet 24, page 1 on one side of the sheet and page 2 on the other side of the sheet. Moreover, the receiver 103 prints on sheet 25 the transmitted page 3 on one side and the transmitted page 4 on the other side. By printing the cover sheet as a simplex document (sheet 21) and printing the remaining portion of the transmitted document as a duplex document, the present invention can provide cost savings to the recipients while preventing the recipient from receiving a document which contains a cover sheet on one side of the sheet and part of the desired transmitted document on the back side of the same sheet.

Figure 4:
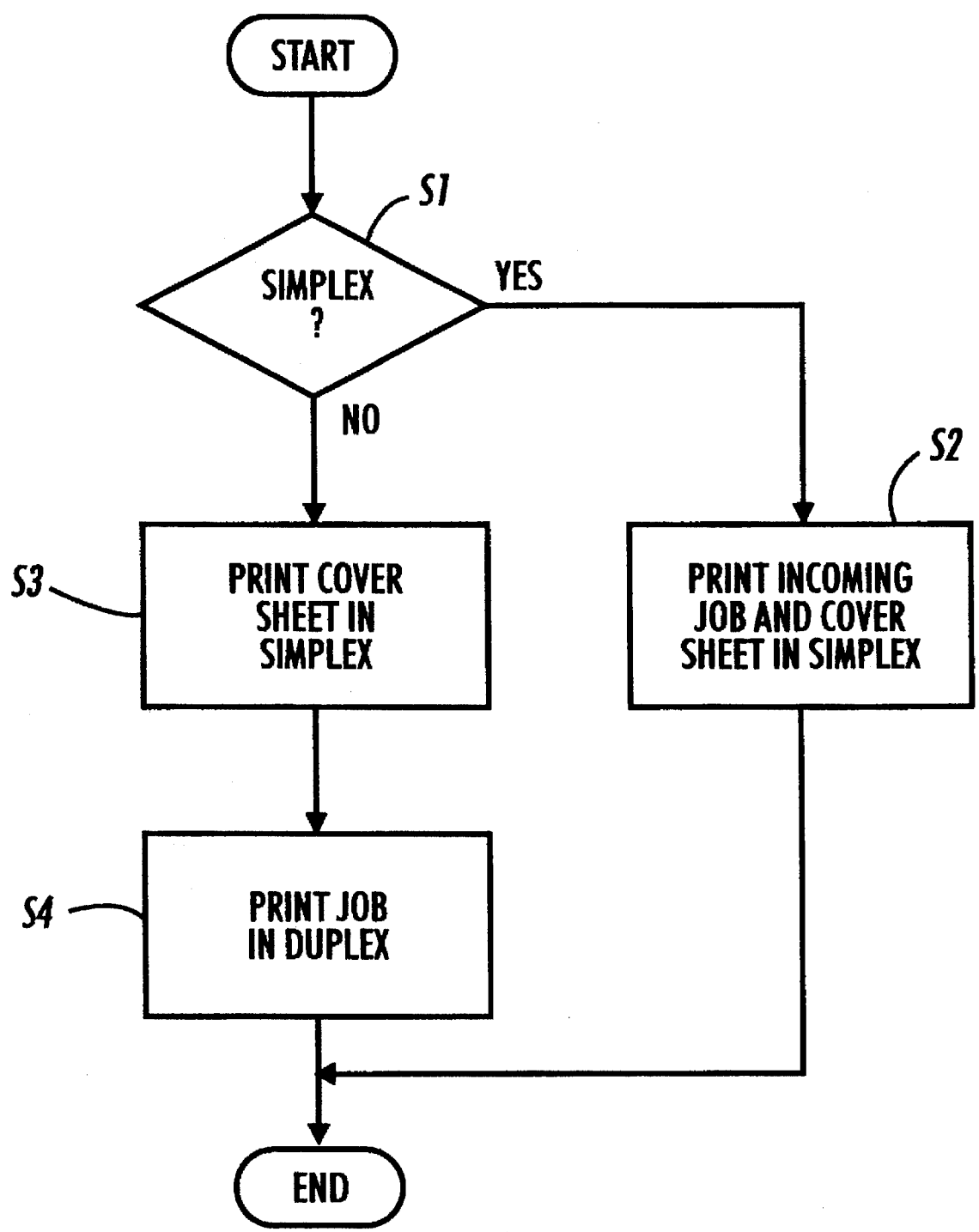
FIG. 4 is a flowchart illustrating the duplex fax printing method of the present invention.

FIG. 4 illustrates a method utilized by the present invention for duplex printing operations. At step S1, the present invention determines whether the user has selected a simplex function or a duplex function. If the user at the receiver's end has selected a simplex function, step S2 causes the receiver to print all incoming fax jobs and cover sheets in a simplex manner. However, if the user on the receiver's end has selected the duplex mode, the receiver prints the first incoming page, under the assumption that it is a cover sheet, as a simplex document at step S3 and prints the remaining portion of the transmitted job in a duplex manner at step S4.

It is noted that the present invention contemplates more than just a selector which toggles between simplex or duplex mode. More specifically, the selector may only allow a simplex selection if the default state of the facsimile machine is a duplex mode. On the other hand, the selector may only allow a duplex selection if the default state is simplex. The selector of the present invention is utilized to enable the facsimile machine to be placed in one state or the other.

In another embodiment of the present invention, the first page of the incoming document is not assumed to be a cover page because the sender of the transmitted document can input into the transmitter whether or not a cover sheet is being transmitted along with a document. By enabling the sender to indicate whether a cover sheet is being transmitted or not, the present invention can avoid printing the first page of the received document in simplex and the remaining pages as duplex when there is no cover sheet. This embodiment will be explained with respect to FIG. 5.

Figure 5:
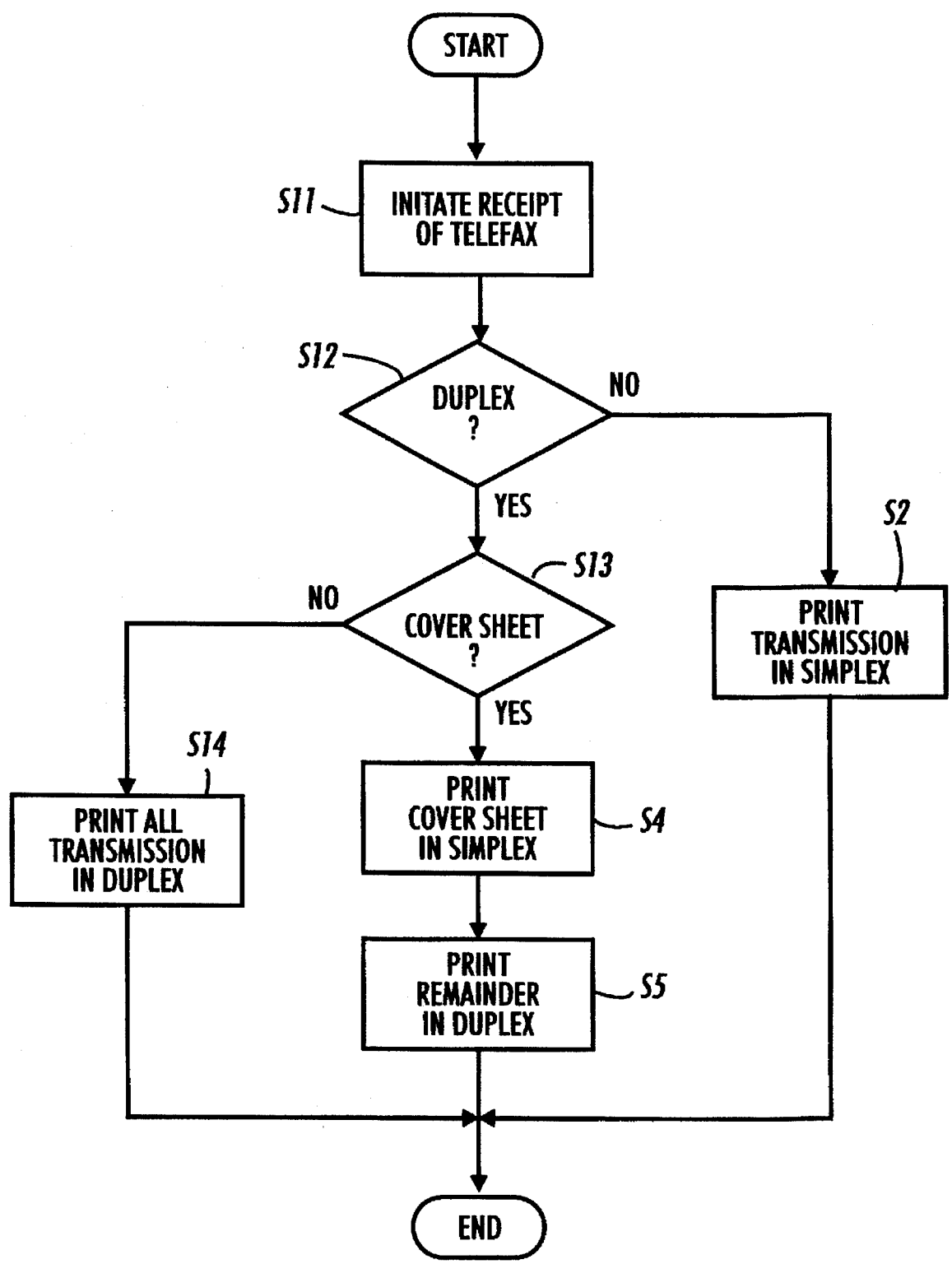
FIG. 5 is a flowchart showing another embodiment of the method of duplex fax printing according to the present invention.

As illustrated in FIG. 5, step S11 initiates the receipt of the telefax communication. Upon the initiation of the telefax communication, step S12 determines whether the user at the receiving end has selected the duplex mode for printing the facsimile transmission. If the duplex mode has not been selected, the receiver prints the entire transmission as a simplex document at step S2.

However, if the user at the receiver's end has selected a duplex printing mode, the receiver determines whether the sender has indicated that a cover sheet has been transmitted at step S13. The determination of a transmission of a cover sheet can be realized in many different ways.

For example, when in a duplex mode, the receiver may query the transmitter prior to transmission of the image data as to the presence of a cover sheet in the transmitted document. In response to this query, the transmitter could reply with a simple "yes" or "no". This exchange can be realized with a simple change in the facsimile protocol procedures and will allow the receiver to print the document in the correct duplex manner.

On the other hand, the cover sheet could contain a machine-readable encoded message in the upper portion of the sheet that when received by the receiver will identify this sheet or page as a cover page. The encoded message may be glyphs, a barcode, or other scheme that is located in a predetermined location such that the receiver can easily detect and decode the message. This solution does not require any changes in the facsimile protocol procedures only that all cover pages be printed with the proper identification machine readable code.

If no cover sheet has been transmitted, the receiver prints the entire transmission in a duplex manner at step S14. However, if the user on the receiver's end has selected the duplex mode and the transmission of a cover sheet has been determined, the receiver prints the cover sheet as a simplex document at step S4 and prints the remaining portion of the transmitted job in a duplex manner at step S5.

In summary, the present invention provides a facsimile transmission to be printed in a duplex fashion while printing the cover sheet in a simplex fashion. One way is to assume that all facsimile transmissions contain a cover page such that the first page of each transmission is printed as a simplex job and the remaining sheets or pages of the transmission are printed as a duplex job. In another embodiment, the receiver makes a determination as whether a cover sheet is present or not. If a cover sheet is present, the transmission is printed as illustrated in FIG. 3, but if no cover sheet is present, the entire transmission is printed as a duplex document.

Although the present invention has been described with respect to a facsimile environment, it is readily applicable to any network printing environment wherein a banner sheet is printed in a simplex fashion and the document is printed in a duplex fashion.

While the present invention has been described with reference to various embodiments disclosed above, it is not confined to the details set forth above, but is intended to cover such modifications or changes as may come within the scope of the attached claims.

What is claimed is:

1. A method for printing at a receiver a document transmitted from a transmitter, comprising the steps of:
   (a) determining if a present state of operation of the receiver is a duplex mode;
   (b) printing, at the receiver, a first page of the transmitted document as a simplex document for every printing operation that the present state of operation of the receiver is determined to be the duplex mode; and
   (c) printing, at the receiver, a remaining portion of the document as a duplex document for every printing operation that the present state of operation of the receiver is determined to be the duplex mode.

2. The method as claimed in claim 1, further comprising the step of:
   (d) printing, at the receiver, the entire document as a simplex document when the present state of operation of the receiver is determined to be simplex.

* * * * *